(12) United States Patent
Jaeger

(10) Patent No.: US 7,572,519 B2
(45) Date of Patent: Aug. 11, 2009

(54) MULTILAYER STRETCH FILM HAVING CLING PROPERTIES, A METHOD OF PREPARATION THEREOF AND ITS USE FOR STRETCH WRAPPING OPERATIONS

(75) Inventor: Norbert Jaeger, Lauterbach (DE)

(73) Assignee: Duo-Plast AG, Lauterbach (DE)

( * ) Notice: Subject to any disclaimer, the term of this patent is extended or adjusted under 35 U.S.C. 154(b) by 0 days.

(21) Appl. No.: 11/475,429

(22) Filed: Jun. 26, 2006

(65) Prior Publication Data

US 2006/0237883 A1 Oct. 26, 2006

Related U.S. Application Data

(63) Continuation of application No. 09/967,525, filed on Sep. 28, 2001, now abandoned.

(30) Foreign Application Priority Data

Sep. 29, 2000 (EP) .................. 00121408

(51) Int. Cl.
*B32B 7/02* (2006.01)
*B32B 27/08* (2006.01)
*B29C 47/00* (2006.01)
(52) U.S. Cl. .................. 428/515; 428/212; 428/516; 156/244.11
(58) Field of Classification Search .................. 428/212, 428/515, 516, 411.1
See application file for complete search history.

(56) References Cited

U.S. PATENT DOCUMENTS

| | | | |
|---|---|---|---|
| 4,514,465 A | 4/1985 | Schoenberg | |
| 5,756,219 A | 5/1998 | Miro et al. | |
| 5,888,615 A | 3/1999 | Mascarenhas et al. | |
| 5,981,047 A | 11/1999 | Wilkie | |
| 6,402,377 B1 | 6/2002 | Vo et al. | |
| 6,521,338 B1 | 2/2003 | Maka | |
| 6,602,598 B1 | 8/2003 | Simpson et al. | |
| 2002/0050124 A1 | 5/2002 | Jaeger | |
| 2002/0061976 A1 | 5/2002 | Krabbenborg et al. | |
| 2006/0237883 A1* | 10/2006 | Jaeger | .......... 264/564 |

FOREIGN PATENT DOCUMENTS

| | | |
|---|---|---|
| AU | 718525 | 4/2000 |
| EP | 0 317 166 A2 | 5/1989 |
| EP | 1 022 131 A1 | 7/2000 |
| WO | WO 95/15851 | 6/1995 |
| WO | WO 96/29203 | 9/1996 |

OTHER PUBLICATIONS

Free Volume Properties of LLDPE/Erucamide Film Studied by Position Annihilation Spectroscopy, National Science Foundation Tokyo Regional Office, L.B. Muire, Sep. 1999.

* cited by examiner

*Primary Examiner*—Sheeba Ahmed
(74) *Attorney, Agent, or Firm*—Knobbe Martens Olson & Bear, LLP

(57) ABSTRACT

A multilayer stretch film comprising at least a first layer (i) with cling properties comprising an olefin (co)polymer composition, a second layer (ii) with slip properties comprising another olefin (co)polymer composition and if desired at least one core layer (iii) comprising an olefin (co)polymer composition between the first layer (i) and the second layer (ii). The outer surface of the first layer (i) with cling properties is provided with a non-stretchable thin film of one or more slip agent(s) covering at least 50% up to 100% of the outer surface of the first layer (i), lowering the cling properties of the unstretched composite film. The thin film of slip agent(s) is provided either by direct application of the slip agent(s) onto the outer surface or by use of slip agent(s) having limited compatibility with the (co)polymer composition as additive in the (co)polymer composition of the first layer (i). The limited compatibility of the slip agent(s) with the (co)polymer composition of the first layer (i) results in migration of the slip agent(s) to the outer surface and formation of a non-stretchable thin film at the outer surface of the first layer (i). The multilayer stretch film is preferably composed substantially entirely of ethylene or propylene (co)polymer compositions or mixtures thereof. The invention includes a method of preparing a multilayer stretch film according to the present invention by extrusion and the use of the multilayer stretch film in a method for stretch wrapping operations of articles or groups of articles.

24 Claims, No Drawings

MULTILAYER STRETCH FILM HAVING CLING PROPERTIES, A METHOD OF PREPARATION THEREOF AND ITS USE FOR STRETCH WRAPPING OPERATIONS

CROSS-REFERENCE TO RELATED APPLICATIONS

This application is a Continuation of U.S. patent application Ser. No. 09/967,525 filed Sep. 28, 2001, now abandoned and claims priority under 35 U.S.C. §119 to European patent application No. 00121408.9, filed Sep. 29, 2000, which is incorporated herein by reference.

BACKGROUND OF THE INVENTION

1. Field of the Invention

The present invention pertains to a multilayer thermoplastic stretch wrap film, particularly a polyolefin stretch wrap film having a cling layer with a thin non-expandable film of slip agent(s) on the outer surface of this layer, in particular of slip agent(s) of limited compatibility with a polymer composition of the cling layer, a method of preparation thereof and the use of the multilayer stretch wrap film according to the invention for stretch wrapping operations of articles or a group of articles.

2. Description of the Related Art

Stretch films that self-seal when portions are overlapped are known as "cling" films. These films are most often multilayer films and are used in applications where it is desirable to securely hold and/or wrap an article or a group of articles, such as load palletization. For load palletization operations, the film is stretched tightly around the good or plurality of articles situated on a pallet, and self-sealed while the film is still in the stretched condition to create a secure, unitised package. Both unstretched or pre-stretched films are used for load palletization and retention of substantial cling properties and good tear properties while the film is stretch-wrapped is required to maintain the integrity of the unitised load.

From WO 95/15851 a multilayer thermoplastic stretch wrap film is known having at least a layer comprising a film forming branched ethylene polymer composition having a density of 0.90 g/cm$^3$ or less and a layer of at least a film forming olefin polymer composition having a density of greater than 0.90 g/cm$^3$. The film may contain a third core layer of an ethylene polymer between the cling layer and the slip layer.

WO 96/29203 discloses a multilayer stretch wrap plastic film having a cling layer comprising ultra low density polyethylene (ULDPE) and a slip layer comprising a low density (high pressure) polyethylene (LDPE) and a solid particulate antiblock agent.

From EP-A-1 022 131 a multilayer blown stretch film is known comprising a first layer having cling properties and comprising a copolymer of ethylene and a $C_4$-$C_8$-α-olefin, the copolymer having a density in the range of 0.85 to 0.89 g/cm$^3$ and a second layer having substantially no cling properties and comprising at least 70 weight percent of a long chain branched low density polyethylene having a density in the range of 0.915 to 0.940 g/cm$^3$. The film is essentially free of cling or anti-cling additives and a core layer may be present between the first and the second layer.

It is the object of the present invention to provide a multilayer thermoplastic stretch film comprising at least a cling layer and a slip layer having a good balance of the desired mechanical properties, exhibiting an improved low noise level during unwinding from a supplier roll and wrapping goods but having also sufficient cling properties to be useful for wrapping.

SUMMARY OF THE INVENTION

This object is attained by a multilayer stretch film having at least a first layer (i) with cling properties comprising an olefin (co)polymer composition, a second layer (ii) with slip properties comprising another olefin (co)polymer composition, characterised in that the outer surface of the first layer (i) is provided with a non-stretchable thin film of one or more slip agent(s) covering at least 50% up to 100% of the outer surface of the first layer (i) lowering the cling properties of the unstretched film.

The solution of the object of the present invention includes a method of preparing the multilayer stretch film according to the present invention by feeding the (co)polymer compositions into a coextrusion extruder, melting and mixing the (co)polymer compositions at melt temperatures above 175° C. and forming at least two molten (co)polymer composition streams, preferably three molten (co)polymer composition streams, extruding the molten (co)polymer composition streams through a coextrusion feed block to form a multilayer structure of a film tube or a film web blowing up and cooling said film tube or drawing down and cooling said film web and collecting the unstretched web of the multilayer film.

DETAILED DESCRIPTION OF THE PREFERRED EMBODIMENT

According to one embodiment of the invention the thin non-stretchable film on the surface of the first layer (i) is provided by migration of the one or more slip agent(s) of limited compatibility with the (co)polymer composition from the (co)polymer composition of the first layer (i) onto the outer surface of the first layer (i).

According to another embodiment of the invention the thin non-stretchable film on the surface of the first layer (i) is provided by coating the outer surface of the first layer with one or more slip agent(s), for example by printing or other common means for providing thin coatings to a surface of a polymer film. Preferably a coating weight of from 10 to 30 g/m$^2$ is applied.

Preferably at least one core layer (iii) is provided between the first layer (i) and the second layer (ii) comprising an olefin (co)polymer composition. It is possible to arrange one or more core layers, for example two or three core layers within the composite film.

The multilayer film of the present invention is a stretch film, which may be stretched in machine direction. Manually operated stretching is possible between zero and 200 percent of its unstretched length, preferably less than 100 percent stretching takes place. Machine operated stretching takes place by more than 100 percent, preferably by more than 200 percent of its original, unstretched length, without damage thereto, and increase of one-side cling properties with reference to the cling properties of said side of the unstretched film.

Surprisingly it was found that inclusion of one or more organic slip agent(s) having limited compatibility with the (co)polymer composition of the "cling" layer results in migration of the slip agent(s) to the outer surface of said layer during coextrusion of the multilayer stretch film according to the present invention, resulting in the formation of an extremely thin film of the slip agent at the outer surface of said layer lowering the cling properties of the unstretched film. At least 50 percent up to 100% of the surface of the film should be covered by the slip agent(s).

Instead by migration of the slip agent(s) the non-stretchable thin film can be also directly applied to the outer surface of the cling layer.

The presence of the slip agent in the "cling" layer does not lower the adhesion between the "cling" layer and the adjacent "slip" layer or the "core" layer, respectively.

The second layer (ii) has "non-cling" properties but slip properties. "Non-cling" properties shall mean that the amount of cling of such a layer is insufficient to obtain a good self-seal when used in stretching operations although the layer may exhibit a small amount of measurable cling. The cling may be less than 10 g/cm, preferably not more than 5 g/cm as measured according to ASTM D 4649-A3 and A1.2.3 (Test Methods For Peel Cling Of Thin Films) of an unstretched film.

The cling is reported as the force in grams required to separate two strips of film. For film cling determination a 25 mm×178 mm strip of the film to be tested is used either unstretched or stretched to 100 percent or stretched to 200 percent and attached to a 20° incline plane with the layer having "non-cling" properties facing upwards. A second, 25 mm×178 mm strip of film in the same condition (unstretched or stretched) is placed on the top of the first strip the "cling" layer facing downwards. Sufficient pressure is applied with a brush to cause the two strips to adhere together. The end of the second strip at the base of the inclined plane is attached by a clip and a string to an apparatus which can exert a strain at a constant rate, such as an Instron tensile tester. The two strips are separated at a cross head speed of 13 cm/minute until the attached string is parallel with the base of the inclined plane. In general, stretched cling values are less than unstretched cling values. However in the present case, due to the presence of a slip agent at the "cling" surface, the cling of the stretched film is higher than the cling of the unstretched film.

Good self-seal of the film according to the present invention during stretch wrapping operation requires a cling of the first layer in the range of 30 g/cm to 180 g/cm, preferably in the range from 50 g/cm to 150 g/cm, more preferred from 50 to 80 g/cm of the 200% stretched film. However, to reduce the noise level generated during unwinding of the film the cling of the first layer of the unstretched film should be in general as low as possible, but sufficient to achieve the desired cling in the stretched condition. This is obtained by the formation of a thin film of a slip agent or mixture of slip agents during manufacturing of the multilayer stretch film which should cover at least 50% of the surface of the unstretched film. This slip agent(s) is (are) selected to provide a non-stretchable film of that agent so that stretching of the film during wrapping operation results in tearing up of the film of the slip agent and forming at the surface areas which are free of the slip agent, thus, obtaining the desired cling properties.

The cling of the surface of the multilayer stretch film in the unstretched condition is lowered by the presence of the slip agent at the surface in comparison to a film including no slip agent in the cling layer. The cling should be in the range from 80 g/cm to 160 g/cm, preferably of from 90 g/cm to 130 g/cm.

Thus, the noise level generated during unwinding of the film according to the present invention is in maximum 84 dB and is typically significantly less than this, for instance about 77 dB or less.

The multilayer stretch film of the present invention is preferably composed substantially entirely of ethylene or propylene (co)polymer compositions or mixtures thereof.

The olefin (co)polymer composition of the first layer (i) can be selected from low density polyethylene (LDPE), linear low density polyethylene (LLDPE), ultra low density polyethylene (ULDPE), polypropylene or copolymers of said polyolefins with other $C_3$-$C_{12}$-α-olefins or mixtures thereof. The olefin (co)polymer composition has a density of from 0.84 to 0.91 g/cm$^3$, preferably from 0.85 to 0.89 g/cm$^3$.

The olefin (co)polymer composition of the second layer (ii) can be selected from polyethylene homo- and copolymers having a density of from 0.90 g/cm$^3$ to 0.95 g/cm$^3$, polypropylene homo- and copolymers with $C_3$-$C_{12}$-α-olefins having a density of from 0.90 g/cm$^3$ to 0.95 g/cm$^3$ or mixtures thereof.

The core layer (iii) is preferably selected from low density polyethylene (LDPE), medium density polyethylene (MDPE), high density polyethylene (HDPE), linear low density polyethylene (LLDPE), ultra low density polyethylene (ULDPE), polypropylene homo- and copolymers with a $C_3$-$C_{12}$-α-olefin as comonomer or mixtures thereof having a density which is higher than the density of the (co)polymer compositions used for the first layer (i). The density is of from 0.895 to 0.925 g/cm$^3$, preferably of from 0.910 to 0.920 g/cm$^3$.

Useful (co)polymer compositions for the layers are the following:

LDPE (or high pressure) is a homopolymer of ethylene having numerous long chain branches in their molecular structure. Such polymers are readily available commercially having a density of from 0.905 g/cm$^3$ to 0.940 g/cm$^3$ and a melt index ranging from 1 to 7 g/10 min (ASTM D-1238, condition 190° C./2.16 kg).

Commercially available LLDPE are often copolymers of ethylene with a minor amount, typically less than 20 weight percent of a $C_3$-$C_{12}$-α-olefin as comonomer. Suitable α-olefin comonomers are butene-1,1,3-dimethylbutene-1,3-dimethylpentene-1, hexene-1,4-methyl-pentene-1,3-methylhexene-1, octene-1 or decane-1.

The density is from 0.85 to 0.950 g/cm$^3$ and the melt flow value (ASTM D 1238, condition 190° C./2.16 kg) is from about 0.3 to about 10.0 g/10 min.

Ultra low density polyethylene (ULDPE) are commercially available and are often copolymers of ethylene and at least one of $C_3$-$C_{12}$-α-olefin monomers identical with the comonomers of LLDPE.

The density is from 0.84 g/cm$^3$ to 0.915 g/cm$^3$, preferably from 0.85 g/cm$^3$ to 0.91 g/cm$^3$.

The melt index (ASTM D 1238, condition 190° C./2.16 kg) is generally 0.8 g/10 min or less, preferably from 0.5 g/10 min to 7.5 g/10 min, more preferred in the range of 1.0 to 4.0 g/10 min.

MDPE is commercially available having densities from 0.925 to 0.945 g/cm$^3$ and the melt index ranges from 0.4 to 20 g/10 min (ASTM D 1238, condition 190° C./2.16 kg).

These polymers are often copolymers of ethylene and an α-olefin comonomer so that the density of the copolymer decreases as the amount of comonomer increases. Suitable comonomers are $C_3$-$C_{12}$-α-olefins as listed above.

HDPE is a high density polyethylene type having densities greater than 0.945 g/cm$^3$. The melt index is from 0.3 to 20 g/10 min.

Useful are also polypropylene homo- and copolymers with $C_3$-$C_{12}$-α-olefins. The amount of comonomer in the copolymer is in general less than 20 weight percent of the copolymer.

The density of the polypropylene homo- and copolymers is in general from 0.9 g/cm$^3$ to 0.95 g/cm$^3$ and the melt index is from 0.3 to 40 g/10 min.

The first layer or "cling" layer (co)polymer composition preferably comprises ULDPE or LLDPE or homogeneously branched ethylene polymer or mixtures thereof. The density of the polymer composition of this layer should be less than 0.90 g/cm³, preferably in the range of from 0.85 to 0.89 g/cm³.

The cling layer preferably does not contain "cling" additives such as PIB or other known cling additives.

The second layer or "slip" layer (co)polymer composition preferably comprises polypropylene, ethylene propylene copolymers, long chain branched LDPE, MDPE, HDPE, LLDPE or mixtures thereof. The density of this layer should be above 0.90 g/cm³, preferably from 0.91 to 0.96 g/cm³.

The slip layer may contain slip agent(s) within the (co)polymer composition or slip agent(s) may be directly applied to the outer surface of the slip layer to improve the slip behaviour of this layer.

To improve the strength of the multilayer stretch film of the invention at least one core layer is preferably positioned between the cling layer and the slip layer. It is also possible to provide two or more core layers.

The core layer may comprise LDPE, MDPE, HDPE, substantially linear ethylene polymers, LLDPE, ULDPE or mixtures thereof.

The total film thickness of the multilayer film of the present invention can be in the range of from 6 micrometer to 510 micrometer, preferably in the range from 10 micrometer to 150 micrometer and more preferably in the range from 15 micrometer to 30 micrometer.

Typically the slip layer will be thicker than the cling layer. The slip layer typically comprises up to 20 percent, preferably 8 to 12 percent of the total thickness of the film and the cling layer typically comprises up to 15 percent, preferably 5 to 10 percent of the total thickness of the film. The thickness of the core layer, if present, is typically greater than each of the cling layer and slip layer and generally comprises at least 65 percent, preferably from 79 to 87 percent of the total thickness of the film.

According to the present invention the first layer or cling layer comprises one or more slip agent(s) which are selected from stearic acid, 12-hydroxystearic acid, icosanoic acid, docosanoic acid, fatty acid amides such as oleic amide, stearic amide, eruca amide, ethylene disteaoryldiamide, polar ethylene wax, montanic acid, montanic acid ester wax, N,N'-bis-stearoyl ethylene diamine, ester of polycarboxylic acids, e.g. glycerol distearate, glycerol mono-12-hydroxystearate, glycerol tri-12-hydroxystearate, glycerol tribehenate, glycerol trimontanate, ethoxylated fatty acid amines, N,N-bis-(2-hydroxyethylene)amide of long chain fatty acids or mixtures thereof.

The slip agent(s) or mixture thereof is selected that it is of limited compatibility with the (co)polymer composition of the first layer or "cling" layer so that during manufacturing of the multilayer stretch film a non-stretchable extremely thin film at the outer surface of the first layer is formed, this thin film lowering the cling properties of the unstretched multilayer stretch film.

The slip agent(s) can be present in the (co)polymer composition of the first layer in an amount of from 5 to 100,000 ppm based on the weight of the (co)polymer composition, preferably from 10 ppm to 10,000 ppm.

Additives such antiblocking agents, antioxidants (e. g. hindered phenolics or phosphits), pigments, colorants, fillers and processing aids can also be included in the stretch wrapping film of the present invention. However, the additives should be incorporated in such a manner or to an extent that they to not interfere with the substantial cling and slip properties of the multilayer stretch film according to the present invention.

The multilayer film of the present invention may be constructed from two or more film layers by coextrusion techniques with any blown or cast film extrusion equipment known in the art. However, the preferred construction of the multilayer structure is prepared by coextrusion techniques.

Thus, the solution of the object of the present invention includes a method of preparing the multilayer stretch film according to the present invention by feeding the (co)polymer compositions into a coextrusion extruder, melting and mixing the (co)polymer compositions at melt temperatures above 175° C. and forming at least two molten (co)polymer composition streams, preferably three molten (co)polymer composition streams, extruding the molten (co)polymer composition streams through a coextrusion feed block to form a multilayer structure of a film tube or a film web blowing up and cooling said film tube or drawing down and cooling said film web and collecting the unstretched web of the multilayer film.

Preferably, extruding of the molten (co)polymer streams through the coextrusion feed block takes place at temperatures between 160° C. and 300° C.

The unstretched web or tube of the multilayer film is collected preferably in the form of reels, having the cling layer either at the inner side or at the outer side of the wound-up web.

The multilayer film of the invention is preferably a blown film. Suitable blown film processes are described, for example, in *The Encyclopedia of Chemical Technology*, Kirk-Othmer, Third Edition, 1981 (Vol. 16, pp. 416-417 and Vol. 18, pp. 191-192).

For the examples a commercially available device (NEXTROM) for preparation of multilayer blown films was used, which comprises three extruders.

First extruder A: 75 mm diameter-30 D,
Second extruder B: 120 mm diameter-30 D,
Third extruder C: 75 mm diameter-30 D.

The temperature profiles in the extruders were as follows:
Extruder A: 85°-159°-230°-220°-215°-215°-melting temperature 230° C.;
melting pressure: 157 bar.
Extruder B: 190°-195°-205°-210°-215°-215°-melting temperature 257° C.;
melting pressure: 272 bar.
Extruder C: 175°-180°-185°-190°-200°-200°-melting temperature 197° C.;
melting pressure: 72 bar.

Extrusion rate 99 m/min. Temperature of the outer air cooling 10° C.

However, the film can also be prepared by cast extrusion techniques which are well known in the art.

In the embodiment of the invention wherein the (co)polymer composition of the first layer (i) does not contain one or more slip agent(s) the film of the slip agent(s) is applied to the surface of the first layer and if desired also to the second layer subsequent to the extrusion of the multilayer composite film.

The multilayer film of the present invention is particularly suitable for use in load palletization. This process generally involves threading a film from a supply reel through an automated or manual wrapping device and then wrapping the film about an article or group of articles supported on a pallet and sealing the film to itself. In the final, wrapped pallet the slip layer will normally face outwards.

The film according to the present invention has a low noise on unwinding from a supplier roll. In general, noise levels on unwinding do not exceed 84 dB. The noise level is measured using a RION, MA-14 Sound level meter, positioned at 15 cm from the unwinding point of the film supply roll at an unwind speed of 55 m/minute and an environmental noise level of 65 dB.

This low noise level results from the lowered cling properties of the unstretched film. It could be noted that the presence of the slip agent at the surface of the first layer also results in a smoother surface than conventional multilayer stretch films.

The invention is now illustrated by way of the examples.

EXAMPLE 1

Extruder A for the cling layer (first layer (i)) was fed with ULDPE having a density of 0.87 g/cm$^3$ and a MFI (190° C./2.16 kg) of 1 g/10 min (Dow AFFINITY® 8100) comprising 10 wt. % of commercial available slip agent(s).

Extruder B for the core layer (third layer (iii)) was fed with LLDPE having a density of 0.920 g/cm$^3$ and a MFI (190°/2.16 kg) of 1 g/10 min (DOWLEX® 2045 E).

Extruder C for the slip layer (second layer (ii)) was fed with LDPE having a density of 0.928 g/cm$^3$ and a MFI (190°/2.16 Kg) of 3.27 g/10 min (DOW® LD 420 R).

The slip layer and the cling layer each comprise 8% of the total thickness of the composite film, whereas the core layer comprises 84% of the total thickness of the composite film.

The cling was determined according to ASTM D 4649. At 0% elongation 118.4 g/cm and at 200% elongation 132.6 g/cm.

The noise level during unwinding was determined by a commercial sound level meter positioned at 15 cm from the unwinding point at an unwind speed of 55 m/min. and an environmental noise level of 65 dB. The unwinding load was determined by a dynamometer (load cell) at the unwinder.

A relation between the noise and the unwinding load was noted. An unwinding load of 5.44 kg resulted in a noise of 77 dB.

COMPARATIVE EXAMPLE 1

The extrusion of the same composite film as in example 1 was repeated with the exception that the polymer fed to extruder A did not contain any slip agent.

The cling, noise and unwinding load were determined as in example 1. The cling was 153 g/cm at 0% elongation and 100 g/cm at 200% elongation. The unwinding load was 7.3 kg resulting in a noise of 84 dB.

Thus it is evident, that the thin film of the slip agent(s) which is provided according to the invention on the surface of the cling layer lowers the unwinding load without affecting the cling to an undue low level.

EXAMPLE 2

The extrusion of the composite film of comparative example 1 was repeated. However a film of a slip agent (eruca amide) was directly applied to the outer surface of the cling layer (first layer (i)) in amounts of from 10 to 20 g/m$^2$ eruca amide by photogravure printing.

The cling and the unwinding load and thus the noise level were in the same order as in example 1.

What is claimed is:

1. A multilayer stretch film comprising at least a first stretchable layer (i) with cling properties comprising an olefin (co)polymer composition, and a second stretchable layer (ii) with slip properties comprising another olefin (co)polymer composition, wherein the outer surface of the first layer (i) is provided with a non-stretchable thin film (iv) consisting essentially of one or more slip agent(s) covering at least 50% up to 100% of the outer surface of the first layer lowering the cling properties of the unstretched film, wherein the non-stretchable thin film (iv) is formed by migration of the one or more slip agents from the first stretchable layer (i); wherein the one or more slip agent(s) comprises a low molecular weight compound selected from the group consisting of stearic acid, 12-hydroxystearic acid, icosanoic acid, docosanoic acid, fatty acid amides, ethoxylated fatty acid amines, N,N-bis-(2-hydroxyethylene)amides of long chain fatty acids, polar ethylene wax, montanic acid, montanic acid ester wax, N,N-bis-stearoyl ethylene diamine, esters of polycarboxylic acids and mixtures thereof; and wherein stretching the film results in tearing of the non-stretchable thin film (iv) resulting in the film after stretching from 100% to 200% having cling that is higher than the film prior to stretching, said cling following stretching being in the range of 30 g/cm to 180 g/cm.

2. The multilayer stretch film of claim 1, further comprising at least one core layer (iii) comprising an olefin (co)polymer composition present between the first layer (i) and the second layer (ii).

3. The multilayer stretch film of claim 2, wherein layers (i), (ii) and (iii) of the multilayer film consist essentially of ethylene or propylene (co)polymer compositions or mixtures thereof.

4. The multilayer stretch film of claim 3, wherein the olefin (co)polymer composition of the first layer (i) is selected from the group consisting of: low density polyethylene (LDPE), linear low density polyethylene (LLDPE), ultra low density polyethylene (ULDPE), polypropylene and copolymers of these polyolefins with other $C_3$-$C_{12}$-α-olefins or mixtures thereof having a density of from 0.84 to 0.91 g/cm$^3$.

5. The multilayer stretch film of claim 3, wherein the olefin (co)polymer composition of the second layer (ii) is selected from the group consisting of: polyethylene homo and copolymers having a density of from 0.90 g/cm$^3$ to 0.95 g/cm$^3$, polypropylene homo and copolymers with $C_3$-$C_{12}$-α-olefins, having a density of from 0.90 g/cm$^3$ to 0.95 g/cm$^3$ and mixtures thereof.

6. The multilayer stretch film of claim 3, wherein the olefin (co)polymer composition of the at least one core layer (iii) is selected from the group consisting of: low density polyethylene (LDPE), medium density polyethylene (MDPE), high density polyethylene (HDPE), linear low density polyethylene (LLDPE), ultra low density polyethylene (ULDPE), polypropylene homo- and copolymers with $C_3$-$C_{12}$-α-olefins and mixtures thereof having a density which is higher than the density of the olefin (co)polymer composition used for the first layer (i) having a density of from 0.895 to 0.925 g/cm$^3$.

7. The multilayer stretch film of claim 1, wherein the thin non-stretchable film (iv) on the surface of the first layer (i) is provided by migration of the one or more slip agent(s) of limited compatibility with the (co)polymer composition from the (co)polymer composition of the first layer to the outer surface of the first layer (i).

8. The multilayer stretch film of claim 1, wherein the thin non-stretchable film (iv) on the surface of the first layer (i) is provided by coating the outer surface of the first layer with one or more slip agent(s).

9. The multilayer stretch film of claim 8, wherein the slip agent(s) is (are) selected from the group consisting of: stearic acid, 12-hydroxystearic acid, icosanoic acid, docosanoic acid, fatty acid amides such as oleic amide, stearic amide, eruca amide, ethylene disteaoryldiamide, polar ethylene wax, montanic acid, montanic acid ester wax, N,N-bis-stearoyl ethylene diamine, ester of polycarboxylic acids selected from glycerol distearate, glycerol mono-12-hydroxystearate, glycerol tri-12-hydroxystearate, glycerol tribehenate, glycerol trimontanate, ethoxylated fatty acid amines, N,N-bis-(2-hydroxyethylene)amide of long chain fatty acids and mixtures thereof.

10. The multilayer stretch film of claim 1, wherein the slip agent(s) present in the polymer composition of the first layer comprises fatty acid amide selected from the group consisting of: oleic amide, stearic amide, eruca amide, and ethylene disteaoryldiamide.

11. The multilayer stretch film of claim 10, wherein the slip agent(s) is (are) present in the (co)polymer composition of the first layer (i) in an amount of from 10 to 100,000 ppm based on the weight of the (co)polymer composition.

12. The multilayer stretch film of claim 1, wherein the outer surface of the second layer (ii) is also provided with a thin film of one or more slip agent(s) by migration of the slip agent(s) contained within the polymer composition of the second layer (ii) to the outer surface of the second layer or by coating of the surface with one or more slip agent(s).

13. The multilayer stretch film of claim 1, wherein the slip agent(s) present in the polymer composition of the first layer comprises an ester of a polycarboxylic acid selected from the group consisting of glycerol distearate, glycerol mono-12-hydroxystearate, glycerol tri-12-hydroxystearate, glycerol tribehenate, and glycerol trimontanate.

14. A multilayer stretch film comprising at least a first stretchable layer (i) with cling properties comprising an olefin (co)polymer composition, and a second stretchable layer (ii) with slip properties comprising another olefin (co)polymer composition, wherein the outer surface of the first layer (i) is provided with a non-stretchable thin film (iv) consisting essentially of one or more slip agent(s) wherein the non-stretchable thin film (iv) is formed by the migration of one or more slip agents from the first stretchable layer (i) and covers at least 50% up to 100% of the outer surface of the first layer lowering the cling properties of the unstretched film as compared to the cling properties of said multilayer stretch film when stretched to break the non-stretchable thin film (iv) and expose areas of the first stretchable layer (i), wherein the film after stretching from 100% to 200% has a cling in the range of 30 g/cm to 180 g/cm.

15. A multilayer stretch film comprising:
a first stretchable layer with cling properties made from a material comprising an olefin (co)polymer composition and 5-10% of one or more slip agents, and
a second stretchable layer with slip properties comprising another olefin (co)polymer composition,
wherein at least a portion of the slip agents in the first stretchable layer are present on an outer surface of the first layer forming a third layer that covers at least 50% up to 100% of the outer surface of the first layer which tears upon stretching to form areas free of the slip agent thereby lowering the cling properties of the multilayer film in an unstretched state as compared to the stretched state, and wherein the film after stretching from 100% to 200% has a cling in the range of 30 g/cm to 180 g/cm.

16. The multilayer stretch film of claim 15, wherein the one or more slip agent(s) comprises a low molecular weight compound selected from the group consisting of stearic acid, 12-hydroxystearic acid, icosanoic acid, docosanoic acid, fatty acid amides, ethoxylated fatty acid amines, N,N-bis-(2-hydroxyethylene)amides of long chain fatty acids, polar ethylene wax, montanic acid, montanic acid ester wax, N,N'-bis-stearoyl ethylene diamine, esters of polycarboxylic acids and mixtures thereof.

17. A multilayer stretch film comprising
at least a first stretchable layer with cling properties comprising an olefin (co)polymer composition and one or more slip agents, and
a second stretchable layer with slip properties comprising another olefin (co)polymer composition,
wherein the one or more slip agents migrate to form a third layer that covers at least 50% up to 100% of an outer surface of the first layer to have reduced cling properties in an unstretched state as compared to its cling properties in a stretched state, and wherein the film after stretching from 100% to 200% has a cling in the range of 30 a/cm to 180 g/cm.

18. The multilayer stretch film of claim 17, wherein the one or more slip agent(s) comprises a low molecular weight compound selected from the group consisting of stearic acid, 12-hydroxystearic acid, icosanoic acid, docosanoic acid, fatty acid amides, ethoxylated fatty acid amines, N,N-bis-(2-hydroxyethylene)amides of long chain fatty acids, polar ethylene wax, montanic acid, montanic acid ester wax, N,N-bis-stearoyl ethylene diamine, esters of polycarboxylic acids and mixtures thereof.

19. A method of preparing a multilayer stretch film, said film comprising at least a first stretchable layer (i) with cling properties comprising an olefin (co)polymer composition, a second stretchable layer (ii) with slip properties comprising another olefin (co)polymer composition and at the outer surface of the first layer (i) a non-stretchable thin film (iv) consisting essentially of one or more slip agent(s) covering at least 50% up to 100% of the outer surface of the first layer (i) wherein the non-stretchable thin film (iv) is formed by migration of the one or more slip agents from the first stretchable layer (i); and wherein stretching the multilayer film results in tearing of the non-stretchable thin film (iv) resulting in the film after stretching from 100% to 200% having cling that is higher than the multilayer film prior to stretching, said cling following stretching being in the range of 30 g/cm to 180 g/cm, wherein said multilayer film is made by a method comprising:
feeding the (co)polymer compositions for the first layer (i) which comprising one or more slip agent(s) and the second layer (ii), into a coextrusion extruder, melting and mixing each of the (co)polymer compositions itself at melt temperatures above 175° C. and forming at least two molten (co)polymer composition streams;
extruding the molten (co)polymer composition streams through a coextrusion feed block to form a multilayer structure of the film tube Or a film web;
blowing up and cooling said film tube or drawing down and cooling that film web; and
collecting the unstretched web of the multilayer film, wherein the one or more slip agent(s) comprises a low molecular weight compound selected from the group consisting of stearic acid, 12-hydroxystearic acid, icosanoic acid, docosanoicacid, fatty acid amides, ethoxylated fatty acid amines, N,N-bis-(2-hydroxyethylene)amides of long chain fatty acids, polar ethylene wax, montanic acid, montanic acid ester wax, N,N-bis-stearoyl ethylene diamine, esters of polycarboxylic acids and mixtures thereof.

20. The method of claim 19, wherein the molten (co)polymer composition streams are extruded through the coextrusion feed block at temperatures between 160° C. and 300° C.

21. The method of claim 20, wherein unstretched web of the multilayer film is collected in form of reels having the cling layer either at the inner side or at the outer side of the wound-up web.

22. A method of preparing a multilayer stretch film, said film comprising at least a first stretchable layer with cling properties comprising an olefin (co)polymer composition and one or more slip agents, a second stretchable layer with slip properties comprising another olefin (co)polymer composition and a non-stretchable thin film consisting essentially of the one or more slip agents and formed by migration of the one or more slip agents to the outer surface of the first layer which lowers the cling properties of the multilayer film when unstretched as compared to when stretched to tear the non-stretchable thin film, wherein the film after stretching from 100% to 200% has a cling in the range of 30 g/cm to 180 g/cm, said method comprising:

feeding the (co)polymer compositions for the first layer comprising 5%-10% of one or more slip agents and the second layer into a coextrusion extruder, melting and mixing each of the (co)polymer compositions itself at melt temperatures above 175° C. and forming at least two molten (co)polymer composition streams;

extruding the molten (co)polymer composition streams through a coextrusion feed block to form a multilayer structure of the film tube or a film web;

blowing and cooling said film tube or drawing down and cooling that film web; and collecting the unstretched web of the multilayer film.

23. The method of claim 22, wherein the one or more slip agent(s) comprises a low molecular weight compound selected from the group consisting of stearic acid, 12-hydroxystearic acid, icosanoic acid, docosanoic acid, fatty acid amides, ethoxylated fatty acid amines, N,N-bis-(2-hydroxyethylene)amides of long chain fatty acids, polar ethylene wax, montanic acid, montanic acid ester wax, N,N-bis-stearoyl ethylene diamine, esters of polycarboxylic acids and mixtures thereof.

24. A method of stretch Wrapping articles or groups of articles using a multilayer stretch film comprising:

wrapping a multilayer stretch film according to claim 1 about an article or group of articles; and sealing the film to itself.

* * * * *

UNITED STATES PATENT AND TRADEMARK OFFICE
CERTIFICATE OF CORRECTION

| | | |
|---|---|---|
| PATENT NO. | : 7,572,519 B2 | Page 1 of 1 |
| APPLICATION NO. | : 11/475429 | |
| DATED | : August 11, 2009 | |
| INVENTOR(S) | : Norbert Jaeger | |

It is certified that error appears in the above-identified patent and that said Letters Patent is hereby corrected as shown below:

At Column 5, Line 40 delete "disteaoryldiamide," and insert --distearoyldiamide,--, therefore.

At Column 5, Line 60 delete "phosphits)," and insert --phosphites),--, therefore.

At Column 8, Line 9 in Claim 1, delete "N,N-bis" and insert --N,N'-bis--, therefore.

At Column 8, Line 33 in Claim 5, delete "homo and" and insert --homo- and--, therefore.

At Column 8, Line 35 in Claim 5, delete "homo and" and insert --homo- and--, therefore.

At Column 8, Line 63 in Claim 9, delete "disteaoryldiamide," and insert --distearoyldiamide,--, therefore.

At Column 8, Line 64 in Claim 9, delete "N,N-bis" and insert --N,N'-bis--, therefore.

At Column 9, Line 9 in Claim 10, delete "disteaoryldiamide." and insert --distearoyldiamide.--, therefore.

At Column 10, Line 13 in Claim 17, delete "a/cm" and insert --g/cm--, therefore.

At Column 10, Line 20 in Claim 18, delete "N,N-bis" and insert --N,N'-bis--, therefore.

At Column 10, Line 48 in Claim 19, delete "Or" and insert --or--, therefore.

At Column 10, Line 55 in Claim 19, delete "docosanoicacid," and insert --docosanoic acid,--, therefore.

At Column 10, Line 58 in Claim 19, delete "N,N-bis" and insert --N,N'-bis--, therefore.

At Column 12, Line 11 in Claim 23, delete "N,N-bis" and insert --N,N'-bis--, therefore.

At Column 12, Line 14 in Claim 24, delete "Wrapping" and insert --wrapping--, therefore.

Signed and Sealed this
Twentieth Day of December, 2011

David J. Kappos
*Director of the United States Patent and Trademark Office*